United States Patent Office 3,806,508
Patented Apr. 23, 1974

3,806,508
PROCESS FOR THE PREPARATION OF A PURE AMINOTRIAZINE DERIVATIVE
Ferdinand Weinrotter, Walter Bohler, and Gerhard Stern, Linz (Danube), Austria, assignors to Osterreichische Stickstoffwerke Aktiengesellschaft, Linz (Danube), Austria
No Drawing. Filed Mar. 3, 1972, Ser. No. 223,309
Claims priority, application Austria, Feb. 5, 1971, A 952/71
Int. Cl. C07d 55/20, 55/24
U.S. Cl. 260—249.6       8 Claims

ABSTRACT OF THE DISCLOSURE

Amino-triazine-bis- and tris-alkylolalkylethers were obtained in pure form by reacting an aminotriazine derivative of the formula

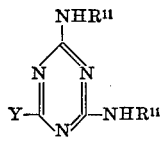

Y being hydrogen, alkyl with 1 to 4 carbon atoms, phenyl or amino and $R^{11}$ being hydrogen and the group

with an excess of aliphatic aldehyde with 1 to 7 carbon atoms and an excess of aliphatic alcohol with 1 to 6 carbon atoms at between 50° C. and the boiling point of the mixture and in presence of p-toluene-sulfonic acid, sulfamic acid, glacial acetic acid or chlorinated acetic acids as a catalyst. Higher ethers may also be obtained from ethyl or methyl-ethers by transetherification.

This invention relates to a process for the preparation of triazine derivatives, and, more particularly, to the preparation of aminotriazine derivatives by reaction of an aminotriazine with an aldehyde and an alcohol in the presence of a catalyst, whereby a pure single product is obtained.

It is known to react melamine with formaldehyde and an alcohol in a two-stage process in order to obtain, for example, a tris-methylolmelamine-methyl-ether if methanol is used. (E. Smolin and Rapoport 1959 "s-Triazines and Derivatives" from the series "The Chemistry of Heterocyclic Compounds.")

West German Auslegungschrift (DAS) No. 1,218,456 discloses a process according to which bis-butylolmelamine-ethers are produced by reaction of melamine in suspension with a butyraldehyde and a lower alcohol, with the addition of major amounts of water and without a catalyst.

In both cases, however, the products obtained are not single substances, which also manifests itself, in the process according to DAS 1,218,456, in the melting point of the products obtained. The process according to DAS 1,218,456 is further more expensive because of the long reaction times and because of the need to constantly mechanically to renew the melamine.

It has now been found, surprisingly, that bis- or tris-alkylolaminotriazine-ethers which are single substances may be obtained from aminotriazines, aldehydes with at least two carbon atoms and lower alcohols in very high yield and in a simple manner by a one-stage process, if the reaction of the aminotriazine with the aldehyde and the alcohol is carried out in the presence of an acid as the catalyst, at a temperature of at least 50° C., both the aldehyde and the alcohol are used in excess and, in contrast to the known process, the presence of large amounts of water in the reaction mixture is avoided. It has further been found that N,N,N-tris-alkylolaminotriazine-ethers may be manufactured from the corresponding N,N-bis-alkylolaminotriazine-ethers by reaction with aldehyde and alcohol in the same manner. Finally, it also has been found that N,N,N-tris-alkylolaminotriazine-ethers may be also trans-etherified under the same conditions by treatment with another alcohol.

Accordingly the present invention provides a process for the preparation of an aminotriazine derivative having the general formula:

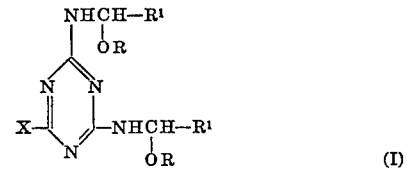

in which R represents an optionally branched alkyl group or alkenyl group containing up to 6 carbon atoms and $R^1$ represents an optionally branched alkyl group containing up to 6 carbon atoms and X is a hydrogen atom or an amino group, an alkyl group containing up to 4 carbon atoms, a phenyl group or the group

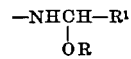

wherein R and $R^1$ are as defined above, which process comprises reacting an aminotriazine derivative having the general formula

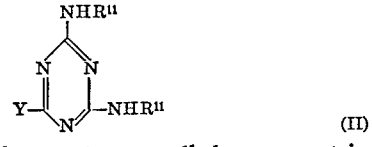

in which Y is a hydrogen atom, an alkyl group containing up to 4 carbon atoms, a phenyl group or an amino group and $R^{11}$ is a hydrogen atom or the group

in which R and $R^1$ are as defined above, with at least one $R^{11}$ being hydrogen if Y is other than an amino group, with at least 0.5 mol excess, over the amount equivalent to the number of

groups to be introduced, of an aldehyde of the general formula

in which $R^1$ is as defined above, and with at least 1 mol excess, over the amount equivalent to the number of

groups to be introduced, of a primary or secondary saturated or unsaturated alcohol of the general formula:

in which R is as defined above, at a temperature of between 50° C. and maximally the boiling point of the reaction mixture, and in the presence of p-toluene sulfonic acid, sulfamic acid, glacial acetic acid and mono- or polychlorinated acetic acid as a catalyst after which, if desired, the ether groups present are trans-etherified by heating with another, preferably longer-chain, primary or secondary alcohol of the fomula R—OH, in which R is as defined above, in the presence the same acids as mentioned above as the catalyst.

As the aldehyde, a straight-chian or branched aliphatic aldehyde is used, and one containing 2, 3 or 4 carbon atoms, such as acetaldehyde, propionaldehyde, n-butyraldehyde and isobutyraldehyde, has proved particularly suitable.

Methanol, ethanol, n- and iso-propanol, n- and isobutanol and allyl alcohol are particularly preferred as straight-chain or branched aliphatic, saturated or unsaturated alcohols containing up to 6 carbon atoms which are capable of undergoing the reaction.

The preferred aminotriazine is melamine, but optionally alkylated or phenylated guanamines also may be used.

The amount of catalyst used is optimally 0.005 to 0.1 mol per mol of aminotriazine.

The optimum reaction temperature must be chosen in accordance with the reactivity of the starting substances, but should preferably be above 55° C. At a boiling point of the reaction mixture of above 85° C., the best results are obtained with a reaction temperature of 55° to 85° C. At lower temperatures the reaction time increases whilst at higher temperatures resinous by-products may be formed.

The presence of large amounts of water has a harmful effect on the reaction according to the invention, so that under no circumstances is addition of water envisaged. Water contained in the starting materials however may be tolerated in the preparation according to the invention, of the bis-ethers of the Formula I, provided it does not exceed 20% by weight in the reaction mixture. To manufacture the tris-ethers of the Formula I, it is advisable to work under conditions which are as nearly anhydrous as possible.

In the manufacture of the bis-alkylolaminotriazine-ethers, 2 mols of aldehyde and 2 mols of alchol react with 1 mol of aminotriazine. However, the reaction only takes place in the desired direction if the aldehyde is employed in an excess of at least 0.5 mol and the alcohol is employed in an excess of at least 1 mol over the stoichiometrically required amount. It is advisable to choose the ratio of aminotriazine to aldehyde to be between 1:2.5 and 1:4, and to have the alcohol, used in a large excess, simultaneously serving as the solvent.

The preparation of the tris-alkylolaminotriazine-ethers theoretically requires a minimum molar ratio of aminotriazine: aldehyde: alcohol of 1:3:3, but it is necessary to have present at least 3.5, preferably at least 4 mols of aldehyde and at least 4 mols of alcohol per mol of melamine. However, it is particularly advantageous for the preparation of the tris-compound if an even greater excess of aldehyde and alcohol is used, and the molar ratio of aminotriazine to aldehyde is appropriately chosen to be between 1:5 and 1:10 whilst the alcohol, in greater excess, simultaneously serves as the solvent.

Theoretically, a molar ratio of 1:1:1 is necessary for the preparation of the tris-alkylolaminotriazine-ether from the bis-alkylolaminotriazine-ether, aldehyde and alcohol, but here again the reaction is favored by using an excess of aldehyde and alcohol, for example an excess of at least twice the molar amount.

The trans-etherification may be carried out in the usual manner by treating the alkylolaminotriazine-ether with an excess of the alcohol to be introduced, preferably at temperatures between 55° C. and the boiling point of the solution, in the presence of p-toluenesulfonic acid, sulfamic acid, glacial acetic acid or mono- or polychlorinated acetic acids in amounts of 0.01 to 0.1 mol per mol of starting substance.

Removal of the alcohol split off from the reaction mixture assists the trans-etherification. This trans-etherification is above all advisable for the introduction of longer-chain groups R, since these already react more sluggishly than those with 1 or 2 carbon atoms. Thus it has proven advantageous in some cases, when preparing compounds of the Formula I in which the groups R represent an alkyl or alkenyl group with 3 to 6 carbon atoms, first to prepare compounds of the Formula I wherein R is a methyl or ethyl group and then to trans-etherify these by reaction with the corresponding higher-chain alcohol. The aminotriazine derivatives prepared according to the invention are obtained in high yield and high purity. They are white, fine powders amongst which above all the tris-alkylolaminotriazine-ethers are easily soluble in the customary organic solvents usch as, for example, alcohols, esters and chlorinated hydrocarbons. They are used as auxiliaries in the lacquer industry and because of their structure are also of interest for further chemical reactions, especially condensations to give higher-molecular products.

The following examples illustrate the process of the invention and the manner in which it may be performed.

EXAMPLE 1

50.4 g. of melamine (0.4 mol), 86.5 g. (1.2 mols) of isobutyraldehyde, 250 ml. of methanol (6.2 mols) and 1 g. of p-toluenesulfonic acid were introduced into a 1 litre round flask with stirrer. The reaction mixture was kept at 64° C. (boiling point) for 5 hours whilst stirring and was then allowed to cool. The mixture was filtered at room temperature and the white residue was dried in a vacuum drying cabinet. 114 g. of N,N'-bis-iso-butylolmelamine-methyl-ether (95.5% of theory) with a nitrogen content of 28.2% (calculated, 28.2%) was obtained. The melting point was 231° to 234° C. (with decomposition).

EXAMPLE 2

50.4 g. of melamine (0.4 mol), 115.2 g. of isobutyraldehyde (1.6 mols), 250 ml. of ethanol (4.35 mols) and 1 g. of glacial acetic acid were reacted at 70° C. as described in Example 1. 123.5 g. of N,N'-bis-isobutylolmelamine-ethyl-ether (94.5% of theory) having a nitrogen content of 25.9% (calculated 25.8%) was obtained. The melting point was 238° to 240° C. (decomposition).

EXAMPLE 3

50.4 g. of melamine (0.4 mol), 115.2 g. of isobutyraldehyde (1.6 mols), 250 ml. of n-propanol (3.33 mols) and 1 g. of p-toluenesulphonic acid were reacted for 5 hours at 70° C., was described in Example 1. 135 g. of N,N'-bis-isobutylolmelamine-propyl-ether (94%) of theory), having a nitrogen content of 23.7% (calculated, 23.7%) was obtained. The melting point was 240° to 243° C. (decomposition).

EXAMPLE 4

50.4 g. of melamine (0.4 mol), 115.4 g. of isobutyraldehyde (1.6 mols), 250 ml. of n-butanol (2.7 mols) and 1 g. of sulphamic acid were reacted for 5 hours at 70° C., as described in Example 1. 145 g. of N,N'-bis-isobutylolmelamine-n-butyl-ether (95% of theory), having a nitrogen content of 22.1% (calculated, 22.0%) were obtained. The melting point was 227° to 229° C. (decomposition).

EXAMPLE 5

50.4 g. of melamine (0.4 mol), 115.4 g. of isobutyraldehyde (1.6 mols), 250 ml. of isobutanol (2.7 mols) and 1 g. of p-toluene-sulphonic acid were reacted for 5 hours at 70° C., as described in Example 1. 146 g. of N,N'-bis-isobutylolmelamine - isobutyl-ether (96% of theory) having a nitrogen content of 22.0% (calculated, 22.0%) was obtained. The melting point was 226° to 229° (decomposition).

EXAMPLE 6

50.4 g. of melamine (0.4 mol), 115.4 g. of isobutyraldehyde (1.6 mols), 300 ml. of isoamyl alcohol (2.8 mols) and 1 g. of p-toluenesulphonic acid were reacted for 7 hours at 70° C., as described in Example 1. 148 g. of N,N'-bis-isobutylolmelamine-isoamyl-ether (90% of theory) having a nitroges content of 20.3% (calculated, 20.5%) was obtained. The melting point was 250° to 252° C. (decomposition).

EXAMPLE 7

50.4 g. of melamine (0.4 mol), 115.4 g. of isobutyraldehyde (1.6 mols) and 300 ml. of 2-propanol and 1 g. of p-toluene-sulphonic acid were reacted for 5 hours at 71° C., as described in Example 1. After this time, the reaction mixture was cooled to room temperature. It was then filtered and the residue was dried in vacuo at 50° C. 137.4 g. of N,N'-bis-isobutylolmelamine-isopropyl-ether (96% of theory) having a nitrogen content of 23.5% (calculated, 23.7%) and a melting point of 247° to 250° C. (decomposition) was obtained.

EXAMPLE 8

50.4 g. of melamine (0.4 mol), 86.5 g. of isobutyraldehyde (1.2 mols), 300 ml. allyl alcohol and 1 g. p-toluene-sulphonic acid were reacted for 5 hours at 70° C. After standing for several hours at room temperature, the mixture was filtered and the residue was dried in vacuo at 50° C. 120.5 g. (85.5% of theory) of N,N'-bis-isobutylolmelamine-allylether having a nitrogen content of 23.7% (calculated, 24.0%) and a melting point of 230° to 232° C. (decomposition) were obtained.

EXAMPLE 9

50.4 g. of melamine (0.4 mol), 72.0 g. of n-butyraldehyde (1 mol), 300 ml. of methanol and 1 g. of p-toluene-sulphonic acid were reacted for 5 hours at 68° C., as described in Example 1. 106 g. of N,N'-bis-n-butylolmelamine-methyl-ether (89% of theory) having a nitrogen content of 28.2% (calculated 28.2%) were obtained. The melting point was 159° to 162° C. (decomposition).

EXAMPLE 10

50.4 g. of melamine (0.4 mol), 69.6 g. (1.2 mols) of propionaldehyde, 300 ml. of isobutanol and 1 g. of p-toluene-sulphonic acid were reacted for 5 hours at 70° C., as described in Example 1. After cooling the mixture, leaving it to stand for several hours at room temperature and subsequently filtering it, 113 g. of N,N-bis-propylolmelamine-isobutylether (80% of theory) having a nitrogen content of 23.8% (calculated, 23.8%) was obtained. The melting point was 230° to 232° C. (decomposition).

EXAMPLE 11

50.4 g. of melamine (0.4 mol), 72 g. of n-butyraldehyde (1 mol), 300 ml. of isobutanol and 1 g. of p-toluene-sulphonic acid were reacted for 5 hours at 70° C., as described in Example 1. 143.5 g. of N,N'-bis-n-butylolmelamine-isobutyl-ether (94.5% of theory) having a nitrogen content of 22.1% (calculated, 22.0%) and a melting point of 238° to 242° C. (decomposition) was obtained.

EXAMPLE 12

50.4 g. (0.4 mol) of melamine, 288.0 g. (4.0 mols) of isobutyraldehyde, 300 ml. of methanol and 1 g. of p-toluene-sulphonic acid were heated to the boil in a 1 liter flask with stirrer and reflux condenser. After 120 minutes, a clear solution was obtained. The solution was brought to room temperature and left thereat for 12 hours. The precipitate which had formed during this time was filtered off, washed with methanol and dried in a vacuum drying cabinet at 50° C. 140 g. (theoretically 153 g.) of N,N',N''-tris-isobutylolmelamine-methyl-ether having a nitrogen content of 21.8% (calculated 21.8%) and a melting point of 161° to 164° C. (decomposition) was obtained.

EXAMPLE 13

50.4 g. (0.4 mol) of melamine, 173 g. (2.4 mols) of n-butyraldehyde, 300 ml. of methanol and 1 g. of p-toluene-sulphonic acid were heated for 2 hours to 68° C., as described in Example 12, a clear solution being produced after 90 minutes. After cooling to room temperature and standing for 12 hours at this temperature, the resulting precipitate was filtered off and dried in vacuo at 50° C. 139.3 g. (theoretically 153 g.) of N,N',N''-tris-n-butylolmelamine-methyl-ether having a nitrogen content of 21.7% (calculated, 21.8%) and a melting point of 125° to 126° C. (decomposition) was obtained.

EXAMPLE 14

50.4 g. of melamine (0.4 mol), 230 g. of n-butyraldehyde (3.2 mols), 300 ml. of ethanol and 1 g. of p-toluensulphonic acid were reacted for 2 hours at 60° C. and the slightly cloudy solution was then filtered hot and left to cool. After standing for 2 days at room temperature, the mixture was filtered and the residue was dried in a vacuum drying cabinet. 120 g. of N,N',N''-tris-n-butylolmelamine-ethyl-ether (theoretically 170 g.) having a nitrogen content of 20.0% (calculated 19.8%) and a melting point of 133–136° C. (decomposition) was obtained.

EXAMPLE 15

50.4 g. of melamine (0.4 mol), 230.4 g. of n-butyraldehyde (3.2 mols), 300 ml. of isobutanol and 1 g. of p-toluene-sulphonic acid were reacted for 2 hours at 60° C., the slight cloudiness of the solution was eliminated by filtering the hot reaction mixture, and the filtrate was left to cool and filtered after standing for 24 hours at room temperature. After drying the filter cake in a vacuum drying cabinet at 50° C., 162.0 g. of N,N',N''-tris-n-butylolmelamine-isobutyl-ether (theoretically 204 g.) having a nitrogen content of 16.6% (calculated, 16.5%) and a melting point of 162° to 165° C. (decomposition) was obtained.

EXAMPLE 16

50.4 g. (0.4 mol) of melamine, 145.2 g. (2.4 mols) of propionaldehyde, 300 ml. of methanol and 1 g. of p-toluene-sulphonic acid were heated for 2 hours to 64° C., the reaction mixture was cooled to room temperature and left for 24 hours thereat, and the resulting precipitate was filtered off and dried. 130.0 g. of N,N',N''-tris-propylolmelamine-methyl-ether (theoretically 137 g.) having a nitrogen content of 24.1 (sic) (calculated, 24.5%) and a melting point of 153° to 156° C. (decomposition) was obtained.

EXAMPLE 17

78 g. of liquid monomeric acetaldehyde (1.78 mols) are dissolved in 250 ml. of methanol and mixed with 37.2 g. of melamine and 0.8 g. of p-toluene-sulphonic acid. The mixture is heated under reflux (60° C.) for 2 hours and the slightly cloudy solution is filtered hot and left to cool. After standing for several hours at room temperature, the resulting white precipitate was filtered off and dried. The product, 78 g. of N,N',N''-tris-ethylolmelamine-methyl-ether (calculated 90 g.), had a nitrogen content of 28.5% (theoretically 28.0%) and a melting point of 174° to 178° (decomposition).

EXAMPLE 18

100 g. (0.336 mol) of N,N'-bis-isobutylolmelamine-methyl-ether, 80 g. (1.1 mols) of isobutyraldehyde, 190 ml. of methanol and 1 g. of p-toluene-sulphonic acid were heated for 5½ hours to 60° C. and then cooled to room temperature and left for 12 hours. 110 g. of an easily filterable precipitate was separated off, having a nitrogen content of 24.0% (starting product 27.9%). 100 g. of this intermediate product was again boiled with 80 g. of isobutyraldehyde, 300 ml. of methanol and 1 g. of p-toluene-sulphonic acid for 5 hours and again cooled and subsequently left for 12 hours at room temperature. After filtering and drying the filter residue, 106 g. of a product of which the nitrogen content of 22.0% corresponded to that for N,N',N''-tris-isobutylolmelamine-methyl-ether (21.9%) was obtained.

The overall yield was 90% of theory.

EXAMPLE 19

100 g. (0.26 mol) of N,N',N''-tris-isobutylolmelamine-methyl-ether, 320 g. (4.3 mols) of isobutanol and 1 g. of p-toluene-sulphonic acid were heated to 70° C., whereupon a clear solution was produced, and about 100 ml. were then slowly distilled off in vacuo at 45° C. After leaving the reaction mixture to stand for 24 hours at room temperature and filtering off and drying the precipitate formed, 110 g. of a substance of which the nitrogen content of 16.7% corresponded well to that of N,N',N''-tris-isobutylolmelamine-isobutyl-ether (16.5%) was obtained. The yield was 83% of theory.

EXAMPLE 20

For trans-etherification, 100 g. of N,N-bis-isobutylolmelamine-methyl-ether together with 250 ml. of isobutanol and 1 g. of p-toluene-sulphonic acid were introduced into a 1 litre round flask and heated to 90 C. for 3 hours, whilst stirring. The reaction mixture was cooled to room temperature and then filtered, and the residue was dried in a vacuum drying cabinet. 116 g. of N,N-bis-isobutylolmelamine-isobutyl-ether (90% of theory) having a nitrogen content of 22.4% (calculated, 22.0%) was obtained. The melting point was 223° to 225° C. (decomposition).

EXAMPLE 21

50 g. (0.4 mol) of 2,4-diamino-6-methyl-s-triazine, 115 g. (1.6 mols) of isobutyraldehyde, 300 ml. of methanol and 1 g. of p-toluene-sulphonic acid were reacted in a 1 litre flask at a temperature of 64° C. (reflux) for 3 hours, with constant stirring. The resulting clear solution, after cooling to room temperature, deposits 107 g. (theoretically 114 g.) of N,N' - bis - (1-methoxyisobutylamino)-6-methyl-s-triazine crystals, showing a nitrogen content of 23.5% (calculated, 23.6%) after drying in a vacuum drying cabinet at 50° C. The melting point was 193° to 195° C. (decomposition).

EXAMPLE 22

50.4 g. (0.4 mol) of melamine, 288.0 g. (4.0 mols) of isobutyraldehyde, 300 ml. of methanol and 1 g. of monochloroacetic acid were heated to boil in a 1 litre flask with stirrer and reflux condenser. After 120 minutes, a clear solution was obtained. The solution was brought to room temperature and left thereat for 12 hours. The precipitate which has formed during this time was filtered off, washed with methanol and dried in a vacuum drying cabinet at 50° C. 138.5 g. (theoretically 153 g.) of N,N'',N'''-tris-isobutylolmelamine-methyl-ether having a nitrogen content of 21.7% (calculated 21.8%) and a melting point of 161 to 164° C. (decomposition) was obtained. When 1 g. trichloro-acetic acid instead of monochloro-acetic acid was used as the catalyst, the same results were obtained.

What we claim is:

1. A process for the preparation of a pure aminotriazine derivative having the formula

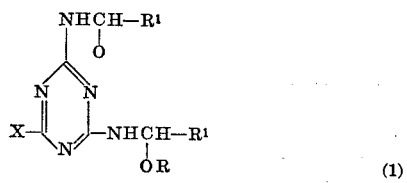

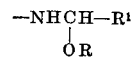 (1)

in which R is selected from the group consisting of alkyl having 1 to 6 carbon atoms, isoalkyl having 1 to 6 carbon atoms and alkenyl having 2 to 6 carbon atoms and $R^1$ is an alkyl having 1 to 6 carbon atoms and isoalkyl having 1 to 6 carbon atoms and X is selected from the group consisting of hydrogen, amino, alkyl having 1 to 4 carbon atoms, phenyl and the group $$-\text{NHCH}-R^1$$
$$\quad\quad |$$
$$\quad\quad \text{OR}$$

wherein R and $R^1$ are as defined above, which process comprises reacting an aminotriazine derivative having the formula

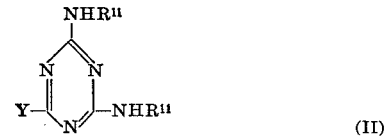 (II)

in which Y is selected from the group consisting of hydrogen, alkyl having 1 to 4 carbon atoms, phenyl and amino and $R^{11}$ is selected from the group consisting of hydrogen and the group

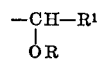

in which R and $R^1$ are as defined above, with at least one $R^{11}$ being hydrogen if Y is other than amino, with at least 0.5 mol excess, over the amount equivalent to the number of

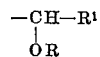

groups to be introduced, of an aldehyde of the formula

 (III)

in which $R^1$ is as defined above, and with at least 1 mol excess, over the amount equivalent to the number of

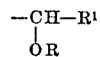

groups to be introduced, of an alcohol of the formula

R—OH (IV)

in which R is as defined above, at a temperature of between 50° C. and maximally the boiling point of the reaction mixture, and in the presence of a catalyst selected from the group consisting of p-toluene-sulfonic acid, sulfamic acid, glacial acetic acid and mono- or polychlorinated acetic acid, the total amount of water in the reaction mixture not exceeding 20% by weight.

2. A process according to claim 1, in which the alcohol of the Formula IV simultaneously serves as the solvent.

3. A process according to claim 1, in which, if the boiling point of the reaction mixture is above 85° C., a reaction temperature of 55–85° C. is used.

4. A process according to claim 1, in which the catalyst is used in an amount of 0.005 to 0.1 mol per mol of aminotriazine derivative of the Formula II.

5. A process according to claim 1, in which 1 mol of a compound of the Formula II, in which both $R^{11}$ represent hydrogen, is reacted with a 2.5 to 4.0 mols of an aldehyde of the Formula III in the presence of p-toluene-sulphonic acid as the catalyst to give the N,N'-bis-alkylol-aminotriazine of the Formula I, with the alcohol of the Formula IV simultaneously serving as the solvent.

6. A process according to claim 1, in which 1 mol of melamine is reacted with 5 to 10 mols of an aldehyde of the Formula III in the presence of p-toluene-sulphonic acid as the catalyst and in the absence of water, to give N,N',N''-tris-alkylolmelamine-ethers of the Formula I, with the alcohol of the Formula IV simultaneously serving as the solvent.

7. A process according to claim 1, in which 1 mol of the N,N'-bis-alkylolmelamine-ether of the Formula II, in which Y represents a NH₂-group, is reacted with at least two mols of the aldehyde of the Formula III and the alcohol of the Formula IV in the absence of water whereby the aldehyde and the alcohol used are the same as that alcohol and aldehyde, from which the

groups already present are derived, to give the N,N',N''-tris-alkylolmelamine-ether of Formula I.

8. A process according to claim 1 for preparing an aminotriazine derivative of the formula

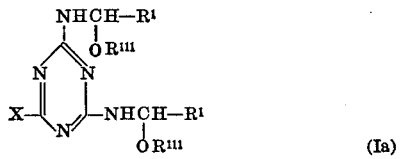 (Ia)

in which $R^{111}$ is selected from the group consisting of alkyl, isoalkyl or alkenyl, all having 3 to 6 carbon atoms, X and $R^1$ being defined as above, which process comprises reacting an aminotriazine derivative having the formula

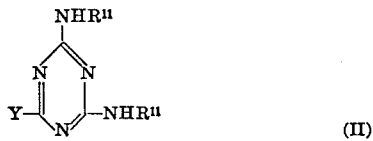 (II)

in which $R^{11}$ and Y are as defined above, with at least one $R^{11}$ being hydrogen if Y is other than amino, with at least 0.5 mol excess, over the amount equivalent to the number of

groups to be introduced, of an aldehyde of the formula

 (III)

in which $R^1$ is as defined above, and with at least one mole excess, over the amount equivalent to the number of

groups to be introduced of an alcohol selected from the group consisting of methanol and ethanol, the resulting aminotriazine derivative then obtained being subsequently transetherified by warming in an alcohol of the formula $R^{111}OH$, in which $R^{111}$ is as defined above, in the presence of a catalyst, selected from the group consisting of p-toluene sulphonic acid, sulfamic acid, glacial acetic acid and a mono- or polychlorinated acetic acid.

References Cited
UNITED STATES PATENTS

| | | | |
|---|---|---|---|
| 2,368,451 | 1/1945 | D'Alelio | 260—249.6 X |
| 2,528,359 | 10/1950 | Greenlee | 260—249.6 X |

JOHN M. FORD, Primary Examiner

U.S. Cl. X.R.

260—249.9